(12) United States Patent
Ortel et al.

(10) Patent No.: US 10,774,985 B1
(45) Date of Patent: Sep. 15, 2020

(54) ACCESS POINT HANGER ASSEMBLY FOR ATTACHMENT TO A SUSPENDED CEILING T-BAR

(71) Applicant: TESSCO Communications Incorporated, Hunt Valley, MD (US)

(72) Inventors: Tim Ortel, Monkton, MD (US); Stephen Powell, Baltimore, MD (US)

(73) Assignee: TESSCO COMMUNICATIONS INCORPORATED, Hunt Valley, MD (US)

( * ) Notice: Subject to any disclaimer, the term of this patent is extended or adjusted under 35 U.S.C. 154(b) by 0 days.

(21) Appl. No.: 16/391,416

(22) Filed: Apr. 23, 2019

(51) Int. Cl.
*F16M 13/02* (2006.01)
*F16B 2/12* (2006.01)

(52) U.S. Cl.
CPC ............ *F16M 13/027* (2013.01); *F16B 2/12* (2013.01); *F16M 13/022* (2013.01)

(58) Field of Classification Search
CPC .......... E04B 9/006; F16M 13/027; F16B 2/12
USPC ..................................... 248/214, 343, 228.3
See application file for complete search history.

(56) References Cited

U.S. PATENT DOCUMENTS

| | | | | |
|---|---|---|---|---|
| 893,378 A * | 7/1908 | Rosenfeld | .................. | F16B 2/12 248/228.3 |
| 989,808 A * | 4/1911 | Rockwood et al. | ...... | F16B 2/12 248/228.3 |
| 1,459,445 A * | 6/1923 | Elderton | .................. | F16B 2/12 24/523 |
| 2,877,974 A * | 3/1959 | Estes | ......................... | E04B 9/18 248/228.3 |
| 3,018,080 A * | 1/1962 | Loudon | .................. | E04B 9/006 248/228.4 |
| 3,053,494 A * | 9/1962 | Stoll | ......................... | F16L 3/24 248/228.3 |
| 4,251,961 A * | 2/1981 | Deibele | .................... | A01G 9/22 52/63 |
| 5,335,890 A * | 8/1994 | Pryor | ....................... | A47H 1/04 16/94 D |
| 6,334,285 B1 * | 1/2002 | Kirschner | ................. | E04B 9/18 248/228.1 |
| 7,161,554 B2 * | 1/2007 | Nugnes | ................... | E04B 9/006 343/878 |
| 7,264,211 B2 * | 9/2007 | Lindner | ................. | E04B 9/006 248/220.21 |
| 7,784,755 B1 * | 8/2010 | Johnson | ................. | E04B 9/006 248/220.21 |

(Continued)

*Primary Examiner* — Bradley Duckworth
(74) *Attorney, Agent, or Firm* — Shlesinger, Arkwright & Garvey LLP

(57) ABSTRACT

A hanger assembly for clamping onto a T-bar of a suspended ceiling, the T-bar including a flange portion and a web portion, the hanger assembly including a first bracket for attaching to an access point, the first bracket including a first horizontal wall for hanging onto one section of the flange on one side of the web portion; a second bracket slidable with respect to the first bracket, the second bracket including a second horizontal wall for hanging onto another section of the flange portion on another side of the web portion; a first guideway and a second guideway attached to the first bracket; the second bracket is slidable toward or away from the first bracket along the first and second guideways; and a first spring to urge the second bracket toward the first bracket.

19 Claims, 3 Drawing Sheets

(56) References Cited

U.S. PATENT DOCUMENTS

| | | | | |
|---|---|---|---|---|
| 8,453,988 | B2* | 6/2013 | Simpson | E04B 9/006 248/228.3 |
| 10,161,565 | B2* | 12/2018 | Wu | F16F 1/14 |
| 10,514,127 | B2* | 12/2019 | Wu | F16M 13/027 |
| 10,533,703 | B1* | 1/2020 | Nguyen | F16M 11/045 |
| 2014/0117186 | A1* | 5/2014 | Govindasamy | F16M 13/027 248/317 |

* cited by examiner

ACCESS POINT HANGER ASSEMBLY FOR ATTACHMENT TO A SUSPENDED CEILING T-BAR

FIELD OF THE INVENTION

The present invention is directed to a hanger assembly for attaching an access point or other equipment to a suspended ceiling T-bar.

BACKGROUND OF THE INVENTION

Access points used for WIFI coverage are typically mounted to suspended ceiling grids made of T-bars inside of buildings. T-bars come in different widths and the existing mounts need to be manually adjusted or a separate mount is required per T bar thickness.

SUMMARY OF THE INVENTION

The present invention provides a hanger assembly for clamping onto a T-bar of a suspended ceiling, the T-bar including a flange portion and a web portion, the hanger assembly comprising a first bracket for attaching to an access point, the first bracket including a first horizontal wall for hanging onto one section of the flange on one side of the web portion; a second bracket slidable with respect to the first bracket, the second bracket including a second horizontal wall for hanging onto another section of the flange portion on another side of the web portion; a first guideway and a second guideway attached to the first bracket; the second bracket is slidable toward or away from the first bracket along the first and second guideways; and a first spring to urge the second bracket toward the first bracket.

The present invention also provides a hanger assembly for clamping onto a T-bar of a suspended ceiling, the T-bar including a flange portion and a web portion, the hanger assembly comprising a first bracket for attaching to an article to be hanged from the suspended ceiling, the first bracket including a first horizontal wall for overlying one section of the flange on one side of the web portion; a second bracket attached to the first bracket, the second bracket including a second horizontal wall for overlying another section of the flange portion on another side of the web portion; the second bracket is adjustable toward or away from the first bracket; and the first bracket including guideways operably associated with the second bracket for keeping the first horizontal wall and the second horizontal wall parallel to each other as the second horizontal wall is adjusted toward or away from the first horizontal wall.

The present invention further provides a hanger assembly for clamping onto a T-bar of a suspended ceiling, the T-bar including a flange portion and a web portion, the hanger assembly comprising a first bracket for attaching to an article to be hanged from the suspended ceiling, the first bracket including first and second slots for receiving one section of the flange on one side of the web portion; a second bracket including third and fourth slots for receiving another section of the flange portion on an opposite side of the web portion; and the second bracket is attached to the first bracket.

DETAILED DESCRIPTION OF THE INVENTION

Figure 1:
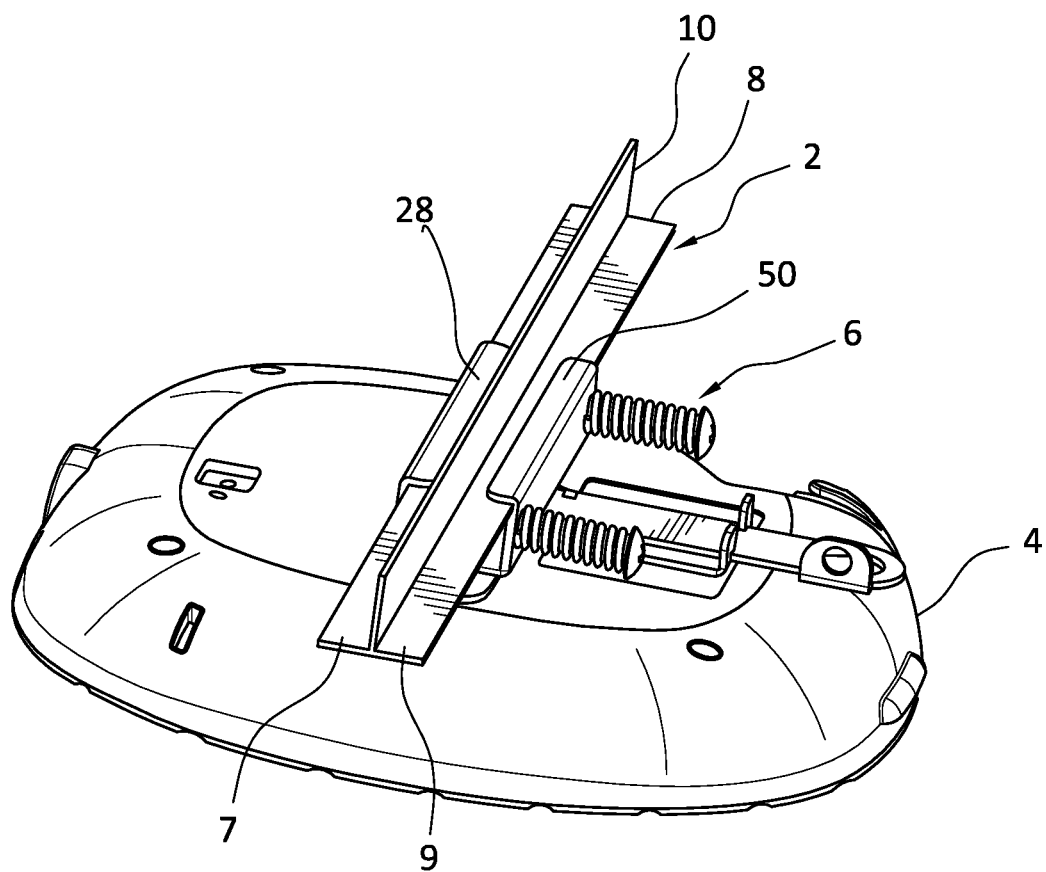
FIG. 1 is a perspective view of a hanger assembly embodying the present invention shown attached to an access point and a T-bar of a suspended ceiling.
Figure 2:
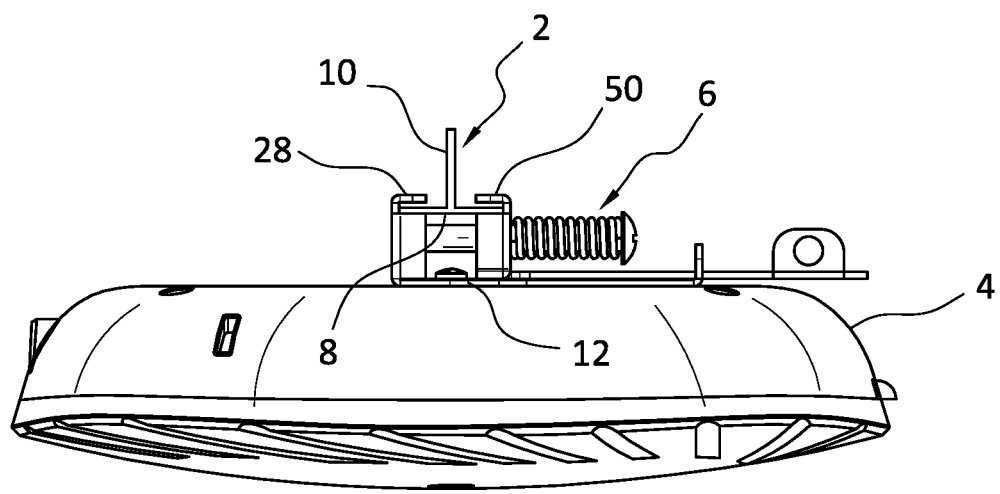
FIG. 2 is a side view of FIG. 1.

Referring to FIGS. 1 and 2, a T-bar 2 used in a suspended ceiling system is shown supporting an access point 4 via a hanger assembly 6, which is made in accordance with the present invention. Although the hanger assembly is disclosed for hanging an access point, the hanger assembly 6 can used for other items that require hanging from a suspended ceiling using a T-bar hardware.

T-bars are known in the art and are hung in a grid design to support ceiling tiles. Access points are networking devices that allow Wi-Fi devices to connect to a wired network, including a wired router, switch, or hub via an Ethernet cable, and projects a Wi-Fi signal to a designated area, such as in an office or large building.

The T-bar 2 includes a horizontal flange portion 8 and a vertical web portion 10, the flange portion 8 and web portion 10 forming an inverted "T" shape. The flange portion 8 includes a section 7 on one side of the web portion 10 and another section 9 on the opposite side of the web portion 10.

The access point 4 is attached to the hanger assembly 6 with screws 12. The hanger assembly 6 attaches to the flange portion 8 of the T-bar 2.

Figure 3:
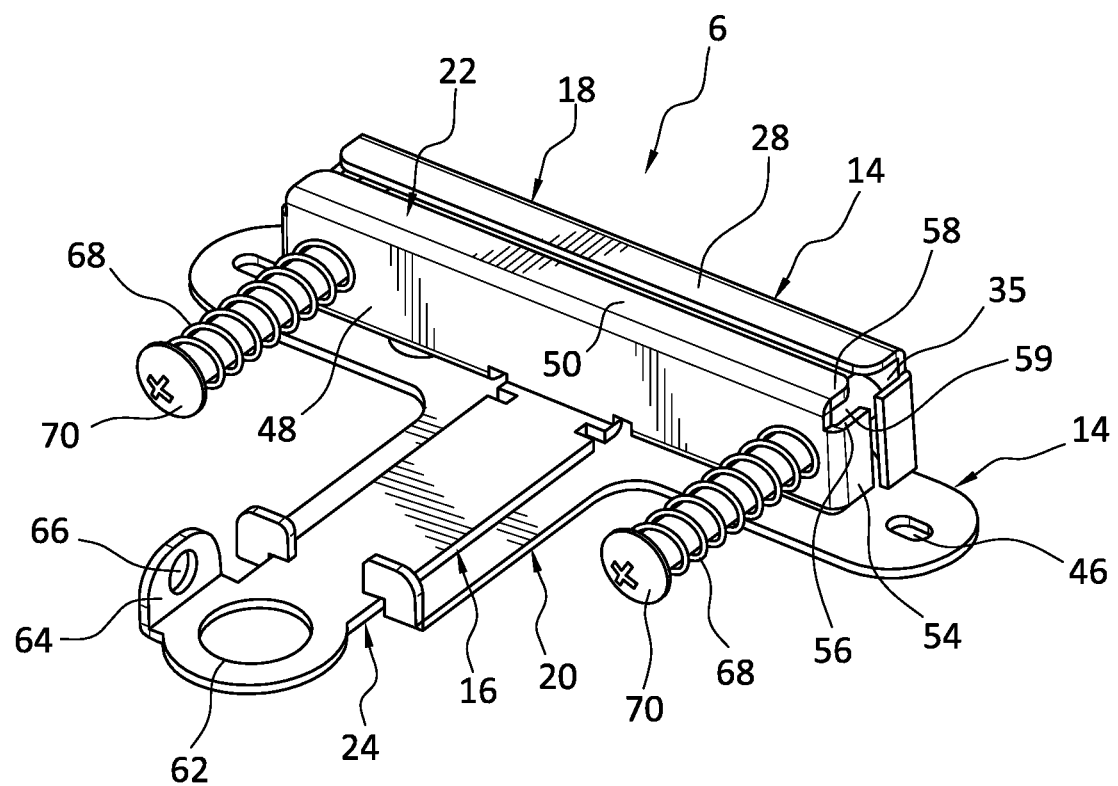
FIG. 3 is a perspective view of the hanger assembly shown in FIG. 1.

Referring to FIG. 3, the hanger assembly 6 includes a stationary bracket 14 relative to the access point 4 and a slidable bracket 16 movable relative to the stationary bracket 14. The stationary bracket 14 includes a fixed jaw 18 attached to a base plate 20. The slidable bracket 16 includes a movable jaw 22 attached to a handle 24. The gap between the fixed jaw 18 and the movable jaw 22 is adjustable to advantageously account for different widths of the T-bar 2.

Figure 4:
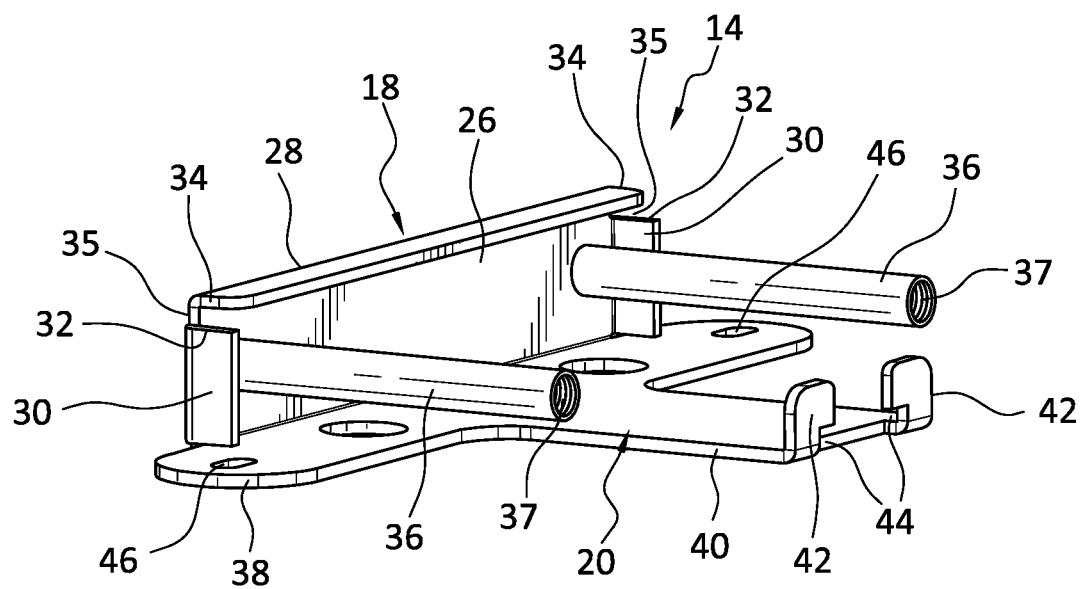
FIG. 4 is a perspective view of a stationary bracket of the hanger assembly shown in FIG. 3.

Referring to FIG. 4, the fixed jaw 18 includes a vertical wall 26 and a horizonal wall 28 attached to the vertical wall 26. Vertical walls 30 are attached to respective ends of the vertical wall 26. The top edges 32 of the vertical walls 30 are spaced from the end edges 34 of the horizontal wall 28 to provide slots 35 to allow section 7 of the flange portion 8 on one side of the web portion 10 of the T-bar 2 to slide underneath the horizontal wall 28. The wall 28 will overlie the section 7 of the flange portion 8 and be supported by the flange portion 8 (see FIGS. 1 and 2). The fixed jaw 18 is made up of a 5-sided box with the walls 26, 28, 30 and the base plate 20. The slots 35 are cut-out from the corners where the walls 30 and 28 meet.

Guideways 36, preferably cylindrical rods, are attached perpendicularly to the vertical wall 26 and parallel to the base plate 20. The guideways 36 are also perpendicular to the wall 28. The guideways 36 include axial threaded holes 37. The base plate 20 may be T-shaped with a beam portion 38 and a post portion 40. Tabs 42 provide a stop for the movable jaw 22. The tabs 42 are preferably perpendicular to the post portion 40. Slots 44 are provided at the end portion of the post portion 40 to guide the handle 24 as the movable jaw 22 moves toward and away from fixed jaw 18. The slots 44 advantageously capture the handle 24 to prevent inadvertent separation. Mounting slots 46 may be used to attach the stationary bracket 14 to the access point 4.

Figure 5:
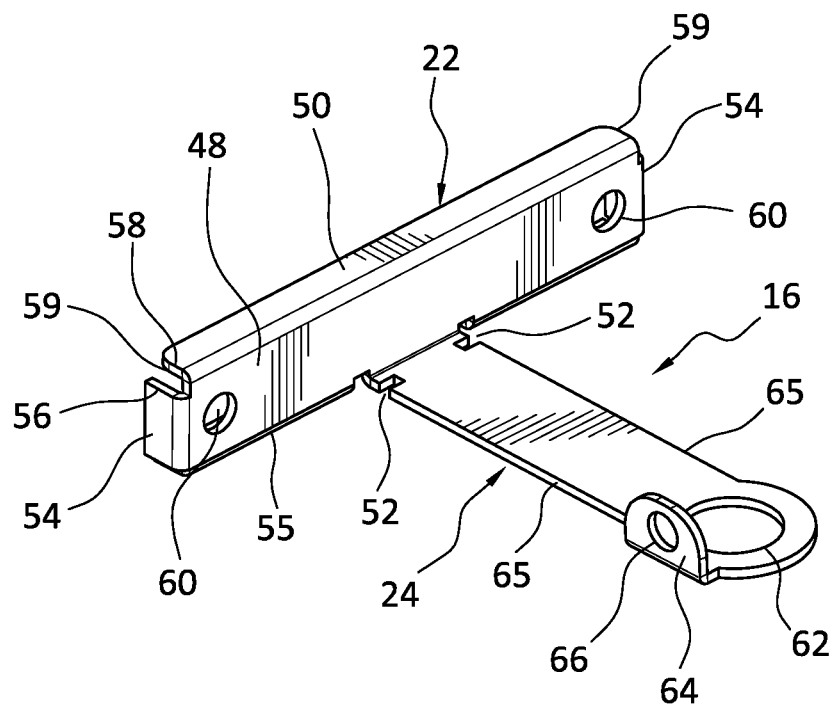
FIG. 5 is a perspective view of a slidable bracket of the hanger assembly shown in FIG. 3.

Referring to FIG. 5, the movable jaw 22 includes a vertical wall 48 and a horizontal wall 50. The wall 48 is preferably perpendicular to the handle 24. Slots 52 are provided at one end of the handle 24 for passing the handle 24 through the tabs 42. Vertical walls 54 are attached to respective ends of the vertical wall 48. The top edges 56 of the vertical walls 54 are spaced from the end edges 58 of the horizontal wall 50 to provide slots 59 to allow section 9 of the flange portion 8 on the other side of the web portion 10 of the T-bar 2 to slide underneath the horizontal wall 50. The wall 50 will overlie the section 9 of the flange portion 8 and be supported by the flange portion 8 (see FIGS. 1 and 2). The fixed jaw 22 is made up of a 5-sided box with the walls 48, 50, 54 and 55. The slots 59 are cut-out from the corners where the walls 50 and 54 meet. The slots 59 are aligned with the slots 35 in the fixed jaw 18. Holes 60 allow the guideways 36 to extend through the wall 48. A finger hole 62 is provided at one end of the handle 24 for drawing the movable jaw 22 away from the T-bar 2. A tab 64 with an opening 66 may be provided for drawing the movable jaw 22 away from the T-bar 2 with the use of a rod inserted into the opening 66. The guideways 36 are preferably parallel to the longitudinal edges 65 of the handle 24. The walls 48 and 50 are preferably perpendicular to the hand 24. The slidable bracket 16 is preferably T-shaped and lays on top of and in correspondence to the T-shape of the base plate 20.

Referring back to FIG. 3, springs 68, preferably coil springs wound around the rods 36, held between the heads of screws 70 and the vertical wall urge the movable jaw 22 against the fixed jaw 18, thereby clamping the flange portion 8 between the vertical walls 26 and 48 and the horizontal walls 28 and 50 hanging onto the flange portion 8 of the T-bar 2. The flange portion 8 is captured inside the slots 35 and 59, with the top edges 32 and 56 of the walls 30 and 54, respectively, providing support against rotational movement. The screws 70 are threaded to the axial threaded holes 37. The tabs 42 advantageously limit the travel of the slidable bracket 16 when drawing the movable jaw 22 away from the T-bar 2.

The hanger assembly 6 is secured to the access point 4 by using screws supplied with the access point and bolting the assembly through the stationary bracket 14 to the back of the access point as shown in FIGS. 1 and 2. Once attached the access point 4 is attached to the hanger assembly 6, the hanger assembly 6 is attached to ceiling T-bar 2 by pulling the handle 24 via the tab 64 or the finger hole 62 on the slidable bracket 16. This action compresses the springs 68 and opens the gap between the fixed jaw 18 and the movable jaw 22, allowing the T-bar 2 to fit between the two jaws 18 and 22. Once the T-bar 2 is between the jaws 18 and 22, the handle 24 is released and the horizontal walls 28 and 50 slide over the base portion of the T-bar 2 and clamp the assembly in place. The springs 68 remain in compression, applying a clamping force to prevent the hanger assembly 6 from coming off the T-bar 2. The hanger assembly 6 will advantageously clamp onto the T-bar with different widths.

To remove the access point 4 and the hanger assembly 6, the handle 24 is pulled using the finger hole 62 or if the area is too tight a rod (not shown) can be inserted in the opening 66 in the tab 64 to pull the handle 24 to draw the movable jaw 22 away from the fixed jaw 18. The movable jaw 22 slides along the guideways 36 through the holes 60. The handle 24 is further guided by the slots 44. At any point along the travel of the slidable bracket 16, the contacts of the wall 48 with the guideways 36 and the contacts of the handle 24 with the slots 44 advantageously provides a stable triangular configuration. This configuration advantageously allows the jaws 18 and 22 to be always parallel to each other as the slidable bracket 16 is slid along the guideways 36 and the slots 44, thereby making for ease of installation or removal.

The hanger assembly 6 advantageously provides for attaching an access point to a suspended ceiling that uses a T-bar grid system. The hanger assembly 6 advantageously allows the user to fasten the hanger assembly to the access point on the ground before climbing a ladder to attach the hanger assembly to the ceiling T-bar. The hanger assembly 6 advantageously accommodates different T-bar thicknesses without the need for manual adjustments or separate clips. The hanger assembly 6 advantageously requires no tools to install or uninstall to the ceiling T-bar.

While this invention has been described as having preferred design, it is understood that it is capable of further modifications, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A hanger assembly for clamping onto a T-bar of a suspended ceiling, the T-bar including a flange portion and a web portion, the hanger assembly comprising:
   a) a first bracket for attaching to an access point, the first bracket including a first horizontal wall for hanging onto one section of the flange portion on one side of the web portion;
   b) a second bracket slidable with respect to the first bracket, the second bracket including a second horizontal wall for hanging onto another section of the flange portion on another side of the web portion;
   c) a first guideway and a second guideway attached to the first bracket;
   d) the second bracket is slidable toward or away from the first bracket along the first and second guideways; and
   e) a first spring to urge the second bracket toward the first bracket.

2. The hanger assembly as in claim 1, wherein:
   a) the first bracket includes a base plate and a first vertical wall perpendicular to the base plate; and
   b) the first horizontal wall is attached to the first vertical wall.

3. The hanger assembly as in claim 1, wherein:
   a) the second bracket includes a handle and a second vertical wall perpendicular to the handle; and
   b) the second horizontal wall is attached to the second vertical wall.

4. The hanger assembly as in claim 2, wherein:
   a) the first and second guideways include respective first and second rods attached perpendicularly to the first vertical wall; and
   b) the second bracket includes first and second openings, the first and second rods extending through the first and second openings, respectively.

5. The hanger assembly as in claim 1, wherein:
   a) the first bracket includes a third guideway; and
   b) the second bracket includes a handle operably associated with the third guideway.

6. The hanger assembly as in claim 5, wherein:
   a) the third guideway includes a first slot and a second slot facing each other; and
   b) the handle is slidable in the first slot and the second slot.

7. The hanger assembly as in claim 3, wherein:
a) the first spring is operably associated with the first guideway; and
b) a second spring is operably associated with the second guideway.

8. The hanger assembly as in claim 7, wherein:
a) the first guideway and the second guideway include a first rod and a second rod attached to the first bracket;
b) the first rod and the second rod extend through the second vertical wall of the second bracket;
c) the first spring and the second spring are held around the first rod and the second rod, respectively; and
d) the first spring and the second spring urge the second vertical wall toward the first vertical wall.

9. The hanger as in claim 1, wherein:
a) the first bracket includes a T-shaped base plate with a beam portion and a post portion; and
b) the second bracket includes a handle that overlies the post portion of the first bracket.

10. A hanger assembly for clamping onto a T-bar of a suspended ceiling, the T-bar including a flange portion and a web portion, the hanger assembly comprising:
a) a first bracket for attaching to an article to be hanged from the suspended ceiling, the first bracket including a first horizontal wall for overlying one section of the flange portion on one side of the web portion;
b) a second bracket attached to the first bracket, the second bracket including a second horizontal wall for overlying another section of the flange portion on another side of the web portion;
c) the second bracket is adjustable toward or away from the first bracket;
d) the first bracket including guideways operably associated with the second bracket for keeping the first horizontal wall and the second horizontal wall parallel to each other as the second horizontal wall is adjusted toward or away from the first horizontal wall;
e) the first bracket including a first vertical wall perpendicular to the first horizontal wall;
f) the guideways including a first rod and a second rod attached perpendicularly to the first vertical wall;
g) the second bracket including a second vertical wall perpendicular to the second horizontal wall; and
h) the first rod and the second rod extend slidingly through the second vertical wall.

11. The hanger as in claim 10, wherein:
a) the second bracket includes a handle disposed between and parallel to the first rod and the second rod;
b) the first bracket includes a first slot and a second slot directed toward each other; and
c) the handle is disposed between the first slot and the second slot.

12. The hanger as in claim 11, wherein:
a) the first bracket includes a T-shaped base plate having a beam portion and a post portion; and
b) the first slot and the second slot are disposed at an end portion of the post portion.

13. The hanger as in claim 10, wherein:
a) a first spring and a second spring are wound around the first rod and the second rod, respectively; and
b) the first spring and the second spring urge the second horizontal wall toward the first horizontal wall.

14. The hanger as in claim 10, wherein:
a) the guideways include a third guideway;
b) the first bracket includes a T-shaped base plate with a beam portion and a post portion; and
c) the third guideway is associated with an end portion of the post portion.

15. A hanger assembly for clamping onto a T-bar of a suspended ceiling, the T-bar including a flange portion and a web portion, the hanger assembly comprising:
a) a first bracket for attaching to an article to be hanged from the suspended ceiling, the first bracket including first and second slots for receiving one section of the flange portion on one side of the web portion;
b) a second bracket including third and fourth slots for receiving another section of the flange portion on an opposite side of the web portion;
c) the second bracket is attached to the first bracket;
d) the second bracket is slidable with respect to the first bracket to engage or disengage the first, second, third and fourth slots from the flange portion of the T-bar; and
e) a spring is operably associated with the first bracket and the second bracket to urge the second bracket toward the first bracket.

16. The hanger assembly as in claim 15, wherein:
a) the first bracket includes a 5-sided box with first and second corners;
b) the second bracket includes a second 5-sided box with third and fourth corners;
c) the first and second slots are cut-out from the first and second corner; and
d) the third and fourth slots are cut-out from the third and fourth corners.

17. The hanger as in claim 15, wherein:
a) the first bracket includes a first horizontal wall for overlying one section of the flange portion on one side of the web portion; and
b) the second bracket including a second horizontal wall for overlying another section of the flange portion on another side of the web portion.

18. A hanger assembly for clamping onto a T-bar of a suspended ceiling, the T-bar including a flange portion and a web portion, the hanger assembly comprising:
a) a first bracket for attaching to an article to be hanged from the suspended ceiling, the first bracket including a first horizontal wall for overlying one section of the flange portion on one side of the web portion;
b) a second bracket attached to the first bracket, the second bracket including a second horizontal wall for overlying another section of the flange portion on another side of the web portion;
c) the second bracket is adjustable toward or away from the first bracket;
d) the first bracket including guideways operably associated with the second bracket for keeping the first horizontal wall and the second horizontal wall parallel to each other as the second horizontal wall is adjusted toward or away from the first horizontal wall;
e) the guideways including a first guideway, a second guideway and a third guideway;
f) the first bracket includes a T-shaped base plate with a beam portion and a post portion;
g) the first guideway and the second guideway are associated with first and second ends of the beam portion, the first guideway and the second guideway are parallel to the post portion; and
h) the third guideway is associated with an end portion of the post portion.

19. A hanger assembly for clamping onto a T-bar of a suspended ceiling, the T-bar including a flange portion and a web portion, the hanger assembly comprising:

a) a first bracket for attaching to an article to be hanged from the suspended ceiling, the first bracket including first and second slots for receiving one section of the flange portion on one side of the web portion;
b) a second bracket including third and fourth slots for receiving another section of the flange portion on an opposite side of the web portion;
c) the second bracket is attached to the first bracket;
d) the first bracket includes a 5-sided box with first and second corners;
e) the second bracket includes a second 5-sided box with third and fourth corners;
f) the first and second slots are cut-out from the first and second corner; and
g) the third and fourth slots are cut-out from the third and fourth corners.

* * * * *